US012634420B1

(12) United States Patent
Adebayo et al.

(10) Patent No.: US 12,634,420 B1
(45) Date of Patent: May 19, 2026

(54) VIRTUAL BACKGROUND COLOR ADJUSTMENT BASED ON PHYSICAL ENVIRONMENT COLOR

(71) Applicant: Zoom Communications, Inc., San Jose, CA (US)

(72) Inventors: Toluwalope Adedoyin Adebayo, Acworth, GA (US); Thanh Le Nguyen, Belle Chasse, LA (US); Kyle Christopher Walker, Austin, TX (US)

(73) Assignee: Zoom Communications, Inc., San Jose, CA (US)

( * ) Notice: Subject to any disclaimer, the term of this patent is extended or adjusted under 35 U.S.C. 154(b) by 132 days.

(21) Appl. No.: 18/390,491

(22) Filed: Dec. 20, 2023

(51) Int. Cl.
| | |
|---|---|
| *H04N 9/74* | (2006.01) |
| *G06T 11/10* | (2026.01) |
| *G06T 11/60* | (2006.01) |
| *H04N 7/14* | (2006.01) |
| *H04N 7/15* | (2006.01) |

(52) U.S. Cl.
CPC .............. H04N 9/74 (2013.01); G06T 11/10 (2026.01); G06T 11/60 (2013.01); H04N 7/142 (2013.01); H04N 7/15 (2013.01)

(58) Field of Classification Search
CPC . H04N 9/74; H04N 7/142; H04N 7/15; G06T 11/001; G06T 11/60
See application file for complete search history.

(56) References Cited

U.S. PATENT DOCUMENTS

| | | | |
|---|---|---|---|
| 11,055,881 B2 | 7/2021 | Bandyopadhyay et al. | |
| 2013/0265382 A1* | 10/2013 | Guleryuz ................ | G06T 11/60 348/14.08 |
| 2021/0252403 A1 | 8/2021 | Stevens | |
| 2022/0070389 A1* | 3/2022 | Tangeland ............. | H04N 23/80 |
| 2022/0415235 A1 | 12/2022 | Singh et al. | |
| 2023/0259202 A1* | 8/2023 | Doken .................... | G06F 3/011 345/633 |

* cited by examiner

*Primary Examiner* — Said Broome
*Assistant Examiner* — Andrew Shin
(74) *Attorney, Agent, or Firm* — Young Basile Hanlon & MacFarlane, P.C.

(57) ABSTRACT

Sensor data that include color data of multiple locations within a physical environment is obtained by a device. A color, based on the color data, is determined of a background area behind a participant device that is used to connect to a videoconference. A new virtual background color to use with a video stream output for display at the participant device is determined based on the color of the background area and a current virtual background color. The video stream is modified to replace the current virtual background color with the new virtual background color.

20 Claims, 8 Drawing Sheets

800

802
OBTAIN SENSOR DATA

804
DETERMINE LOCATION OF PARTICIPANT DEVICE

806
DETERMINE LOCATION AND COLOR OF BACKGROUND AREA

808
DETERMINE NEW VIRTUAL BACKGROUND COLOR

810
MODIFY VIDEO FEED

VIRTUAL BACKGROUND COLOR ADJUSTMENT BASED ON PHYSICAL ENVIRONMENT COLOR

FIELD

This disclosure generally relates to video conferencing, and, more specifically, to adjusting a color of a virtual background based on a color of a physical environment for a participant device used in a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
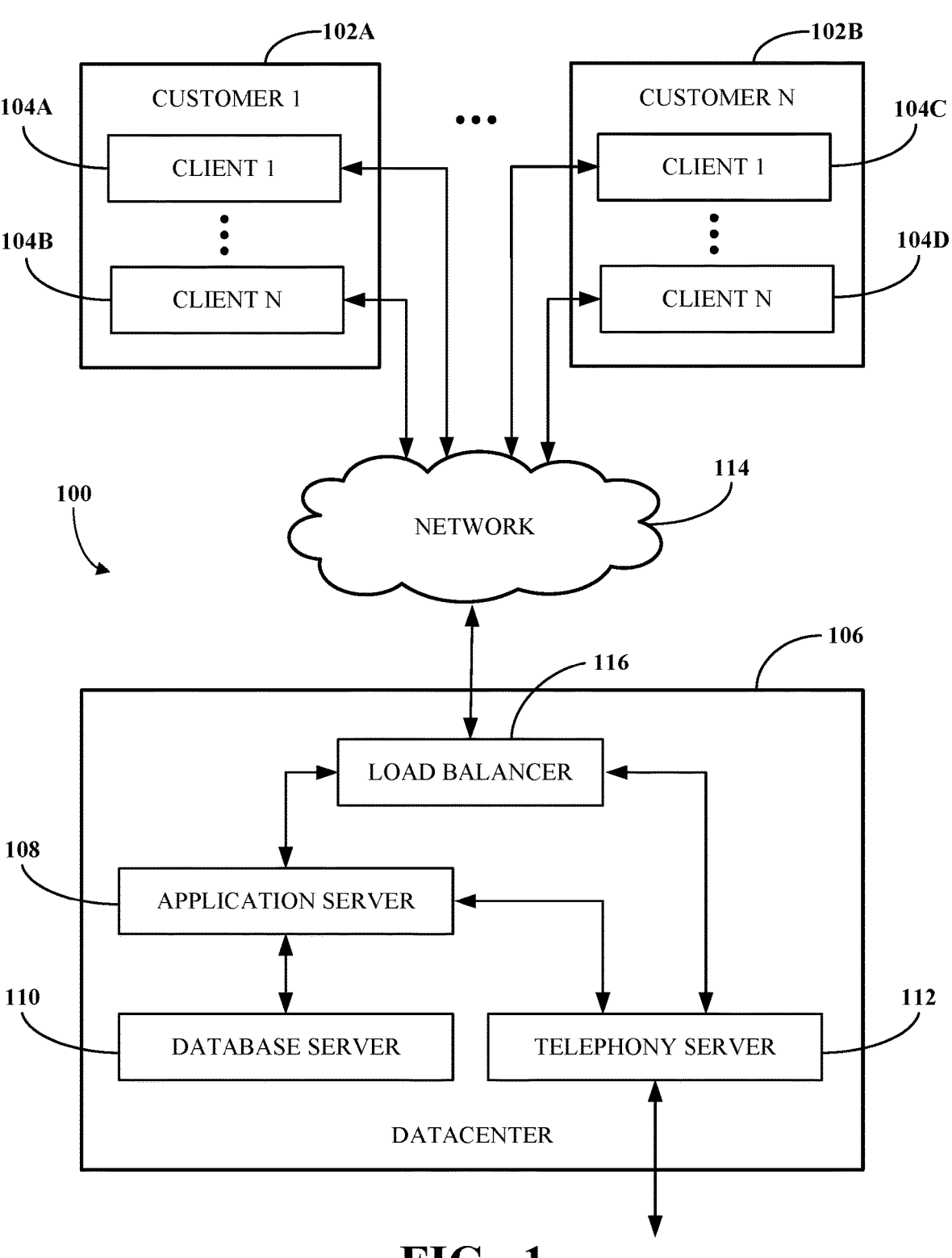
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

However, a virtual background color of a video stream shared during the video conference may result in less than optimum display quality at participant devices located at different physical locations as each physical location may use different color schemes. In particular, the virtual background color of the video stream is typically not optimized for the color of the physical location in which the participant device is located during the video conference. Thus, in some cases, the representation of content, presentation materials, participants, objects, and other items in the video stream may blend-in with the color of the physical location when the video stream is output at the participant device. In these cases, the virtual background color of the shared video stream is similar or substantially similar to the color or hue of the physical location, such as a wall. Certain of the shared video stream may become nearly invisible. For example, if the presenter is wearing a blue suit and the color of the wall is blue, then only a portion of the presenter may be visible. This color matching may make reviewing and understanding of the shared video stream difficult. Furthermore, this can result in in an unappealing or even comical environment for having the video conference, which in turn may lead to unwanted outcomes with respect to the substance of the video conference.

Implementations of this disclosure address problems such as these by determining color(s) of the room behind the participant device that is used to connect to the video conference, and determining a new virtual background color of a video stream based on the color(s) of the room and a current virtual background color that appears in the video stream. For instance, the new virtual background color can be determined such that the new virtual background color and the color(s) of the room or color(s) of wall have contrasting or complementary colors. For instance, after or responsive to determining that the color of the wall and the current virtual background color have the same hue or same tone, the participant device can determine the new virtual background color. For instance, the new virtual background color may be determined based on user preference (e.g., participant preference that indicates certain color preference when the wall color and the video stream color have certain combinations). For instance, the color(s) of the room or the wall behind the participant device may be determined prior to the video conference by using a scanning device (e.g., mobile phone equipped with camera and/or LiDAR sensor) to generate an augmented reality (AR) map. For instance, the new virtual background color can be determined in real-time during the video conference. For instance, the new virtual background color can be determined not only based on the current virtual background color and the color(s) of the room or the wall, but also additional room features such as lighting properties or qualities (e.g., brightness level, light directionality) at different positions within the room.

To describe some implementations in greater detail, reference is first made to examples of hardware and software structures used to implement a system for virtual background color adjustment. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
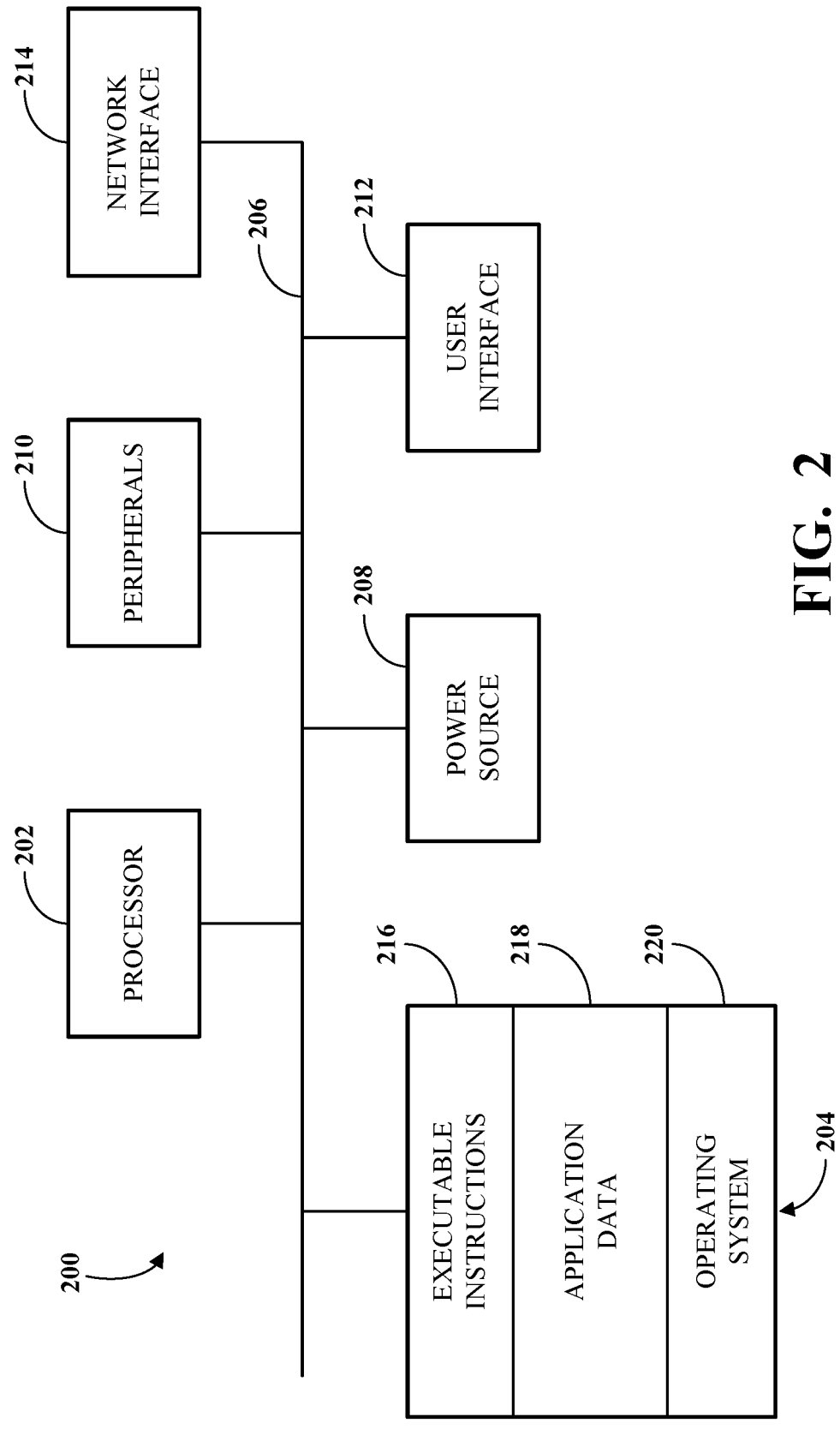
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
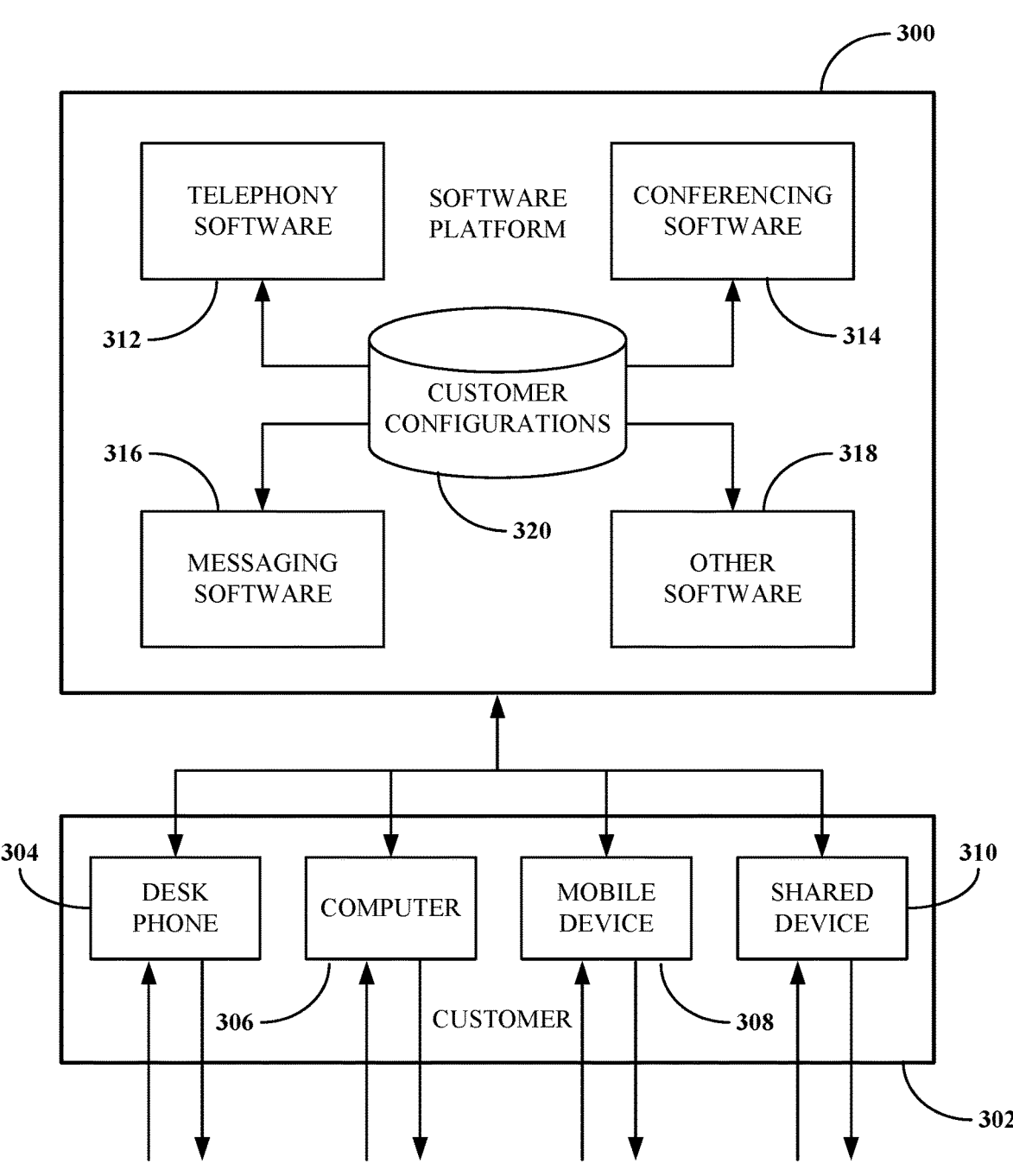
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include virtual background color adjustment software. In some such cases, the conferencing software may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
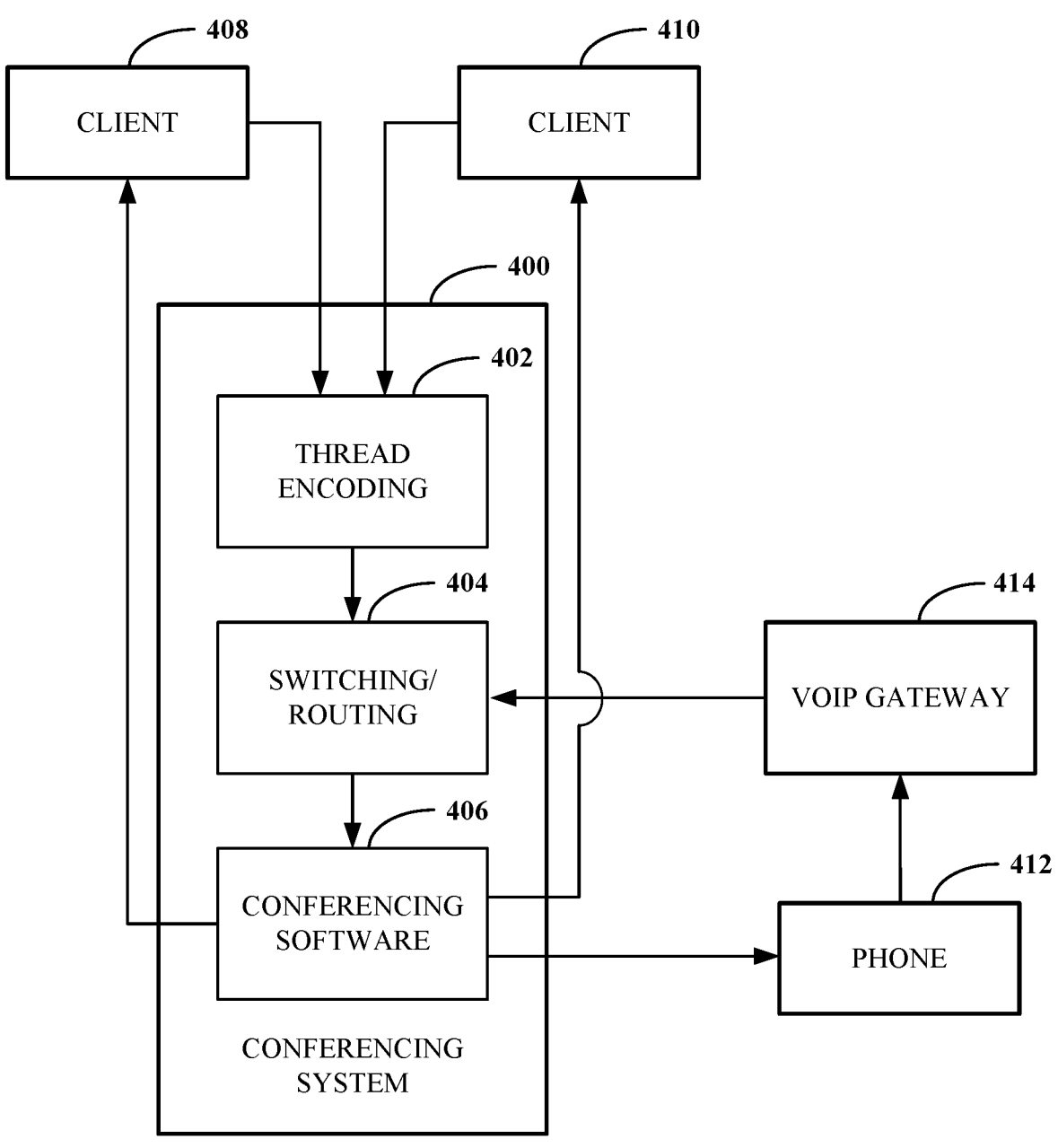
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
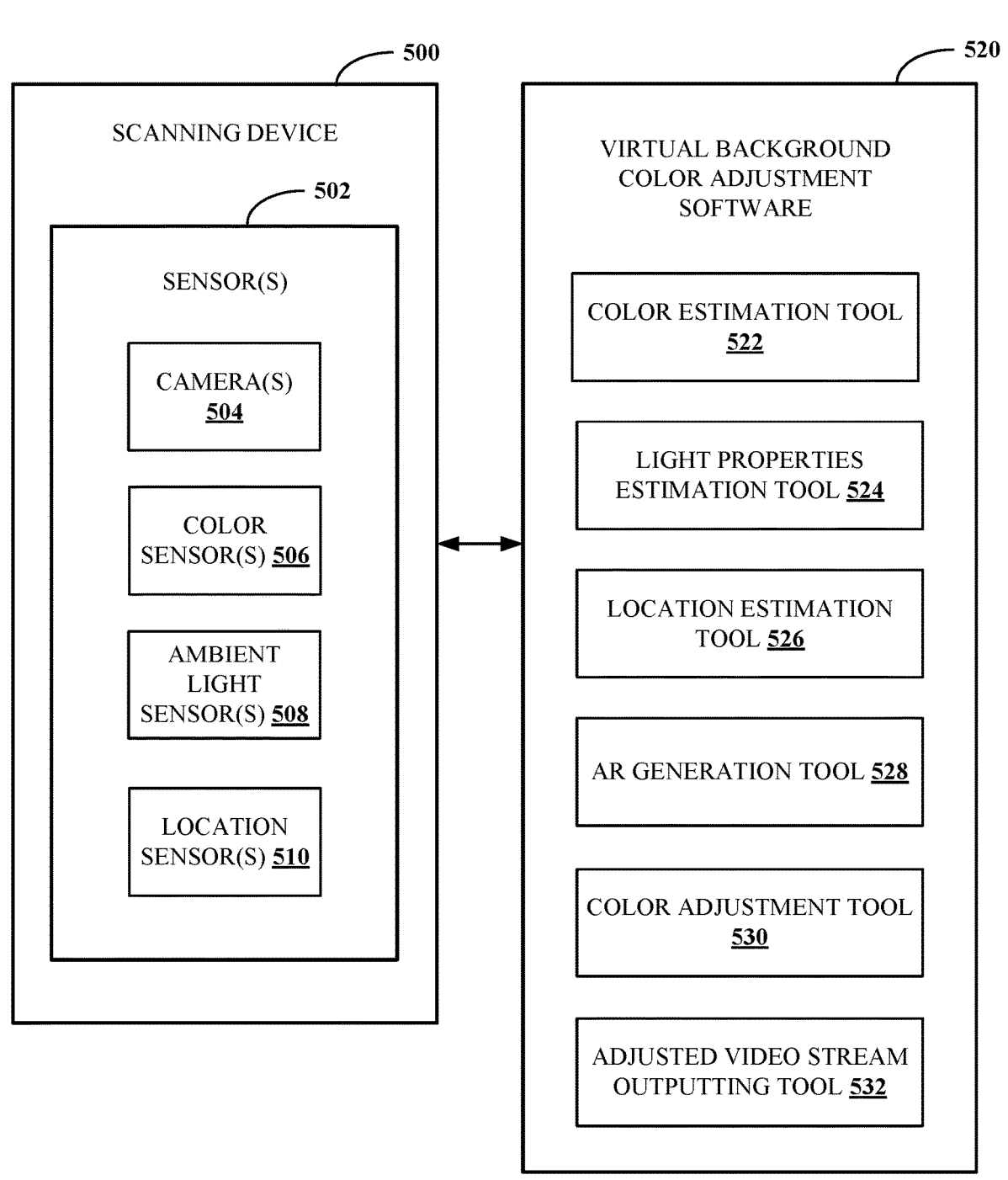
FIG. 5 is a block diagram of an example of a virtual background color adjustment system for determining a new virtual background color for a video stream displayed on a participant device in a video conference.

FIG. 5 is a block diagram of an example of a virtual background color adjustment system for determining a new virtual background color for a video stream displayed on a participant device in a video conference. The virtual background color adjustment system includes or otherwise uses a scanning device 500 (e.g., a mobile device such as a smartphone, a tablet computer, or a laptop computer) including but not limited to, sensor(s) 502, and a virtual background color adjustment software 520 used to process sensor data output by the sensor(s) 502 to modify a video stream to replace a current virtual background color with the new virtual background color based on a color of a location of the participant device in a physical environment. In at least some cases, the scanning device 500, which may, for example, be the mobile device 308 shown in FIG. 3 or another client (e.g., one of the clients 408 or 410 shown in FIG. 4), includes the sensor(s) 502, a memory configured to store instructions for executing the virtual background color adjustment software 520, and a processor configured to execute those instructions. In at least some cases, the virtual background color adjustment software 520 may represent functionality of, and thus be included within, a client application running at the scanning device 500.

The sensor(s) 502 are configured to produce and output sensor data corresponding to ambient qualities of each of one or more locations (e.g., positions) within a physical environment (e.g., an interior or exterior room or space of a house, apartment, office, public facility, or the like). The sensor(s) 502 may include one or more of camera(s) 504, color sensor(s) 506, ambient light sensor(s) 508, or location sensor(s) 510. The location sensor(s) 510 may include one or more of global positioning system (GPS) sensor(s), motion sensor(s) (e.g., accelerometer, gyroscope), and magnetometer(s). Moreover, the sensor(s) 502 may further include one or more of depth sensor(s) (e.g., Light Detection and Ranging (LiDAR) sensor), ultrasonic sensor(s), and sonar sensor(s). Moreover, the LiDAR sensor may be a color LiDAR sensor which can obtain color and location data.

The sensor data obtained from the sensor(s) 502 that represent ambient qualities may include color data, video data, light intensity data, and location data. The ambient qualities may include visual depiction of surroundings, brightness level and/or directions of light, and/or color at each of the one or more locations within the physical environment. The visual depiction of surroundings may be represented by one or more images or a video of the video data obtained by the camera(s) 504. In some implementations, the color at each of the one or more locations may be represented by or determined from the color data or measurements obtained by the color sensor(s) 506 and/or location sensor(s) 510. In some implementations, the sensor(s) 506 and/or location sensor(s) 510 may work in cooperation with color applications executing on or running on the scanning device 500, the participant device, the server, and/or another device to determine the color(s). In some implementations, the color at each of the one or more locations may be based on, or derived by, evaluating the visual depiction of surroundings represented by the one or more images or the video of the video data obtained by the camera(s) 504. For example, pixels in the one or more images of the video data may be utilized to derive or determine the color. Such evaluation of the visual depiction of surroundings to derive the color at each of one or more locations may be performed as part of processing the video data through the virtual background color adjustment software 520. The brightness level and/or the direction of light at each of the one or more locations may be represented by the light intensity data obtained by the ambient light sensor(s) 508. In some implementations, the brightness level and/or the direction of light at each of the one or more locations may be based on, or derived by, evaluating the visual depiction of surroundings represented by the one or more images or the video of the video data obtained by the camera(s) 504. For example, pixels in the one or more images of the video data may be utilized to derive or determine the brightness level and/or the direction of light. For example, a lighting level for each pixel can be used to generate spatial distribution and determine brightness level and/or direction of light. For example, the spatial distribution can indicate pixels or regions which are bright in contrast to pixels or regions which are dark, which in turn can be used to indicate where light is coming from and in what direction. Such evaluation of the visual depiction of surroundings to derive the brightness level and/or the direction light at each of the one or more locations may be performed as part of processing the video data through the virtual background color adjustment software 520.

After the sensor data is collected from the sensor(s) 502, the virtual background color adjustment software 520 may process the sensor data to determine a new virtual background color for use in the video stream for display on the participant device. In some implementations, the participant device and the scanning device 500 may be the same device. In some implementations, the participant device may a different device than the scanning device 500. The participant device may a mobile device (e.g., a smartphone, a tablet computer, or a laptop computer). For example, the participant device may be the mobile device 308 or the computer 306 shown in FIG. 3 or another client (e.g., one of the clients 408 or 410 shown in FIG. 4). For example, the scanning device 500 and the participant device may be two separate mobile devices. For example, while the scanning device 500 may be a smartphone, the participant device may be a laptop. In some implementations, the scanning device 500 may be a laptop or the computer 306, when such laptop is equipped with sensors such as the sensor(s) 502 and can execute the virtual background color adjustment software 520.

The virtual background color adjustment software 520 may include tools, such as programs, subprograms, functions, routines, subroutines, operations, executable instructions, and/or the like for, inter alia and as further described below, determining the new virtual background color used in the video stream displayed on the participant device utilized for participation in the video conference.

At least some of the virtual background color adjustment software 520 can be implemented as respective software programs that may be executed by or run on one or more of the participant device and/or the server. A software program can include machine-readable instructions that may be stored in a memory (such as the memory 204), and that, when executed by the processor, cause the participant device and/or the server to perform the instructions of the software program. As shown, the virtual background color adjustment software 520 may include one or more of a color estimation tool 522, a light properties (i.e., brightness, intensity and/or direction) estimation tool 524, a location estimation tool 526, an AR map generation tool 528, a color adjustment tool 530, and an adjusted video stream outputting tool 532. In some implementations, the virtual background color adjustment software 520 can include more or fewer tools. In some implementations, some of the tools may be combined, some of the tools may be split into more tools, or a combination thereof.

In some implementations, the participant device and/or the server may receive the color of each of the one or more locations in the physical environment from the color sensor(s) 506, the color LiDAR sensor, or combinations thereof. In some implementations, the color estimation tool 522 may estimate the color of each of one or more locations in the physical environment. For example, the sensor data, including the color data, from one or more of the color sensor(s) 506 and/or the color LiDAR sensor may be processed to determine the color. For example, the video or the image(s) of the video data obtained by the camera(s) 504 may be processed to determine the color. For example, pixels in the image(s) of the video data may be utilized to derive or determine the color.

The light properties estimation tool 524 may estimate light properties or characteristics (that are relevant to quality of the video conference), which may include brightness level, light direction, light color temperature, and other characteristics. For example, the video or the image(s) of the video data and/or the light intensity data may be processed to determine the light characteristics. For example, the light characteristics may be based on, or derived by, evaluating the visual depiction of surroundings represented by the one or more images or the video of the video data obtained by the camera(s) 504. For example, pixels in the image(s) of the video data may be utilized to derive or determine the light characteristics. For example, lighting level for each pixel can be used to generate spatial distribution and determine the brightness level, the direction of light, the light color temperature, and other characteristics. For example, the spatial distribution can indicate pixels or regions which are bright in contrast to pixels or regions which are dark, which in turn can be used to indicate where light is coming from and in what direction. For example, the light direction may be determined based on shadows casted by the light, orientations of the shadows, and/or specular reflections or highlights on objects. For example, the light color temperature may be determined by evaluating a white balance or detecting known objects and assessing color deviation from expected color.

The location estimation tool 526 may be used to detect and identify objects and the one or more locations within the physical environment. For example, the location estimation tool 526 may utilize the sensor data to identify feature points (e.g., high-contrast points) in the scene that can be tracked frame to frame from the camera(s) 504 or the video data. For example, simultaneous localization and mapping (SLAM) techniques may be used to map an environment while keeping track of location. For example, the video data or the camera(s) 504 of the scanning device 500 may be used to detect and track the visual features in the environment, such as objects, corners, walls, blinds, textured regions, etc. For example, the SLAM technique can compare known motion of the scanning device 500 based on the motion sensor(s) with the visual motion observed from the camera(s) 504 or the video data, such that the map which includes the feature points and/or the multiple locations within the physical environment can be generated. Moreover, the SLAM technique may further utilize data obtained from depth sensor(s) (e.g., LiDAR sensor) that can obtain sensor data representing or including the distance to objects, the feature points, and/or the one or more locations within the physical environment to help create the map with accurate measurement of the distance to and between the objects, the feature points, and/or the multiple locations. For instance, the object may be the participant device.

Figure 6:
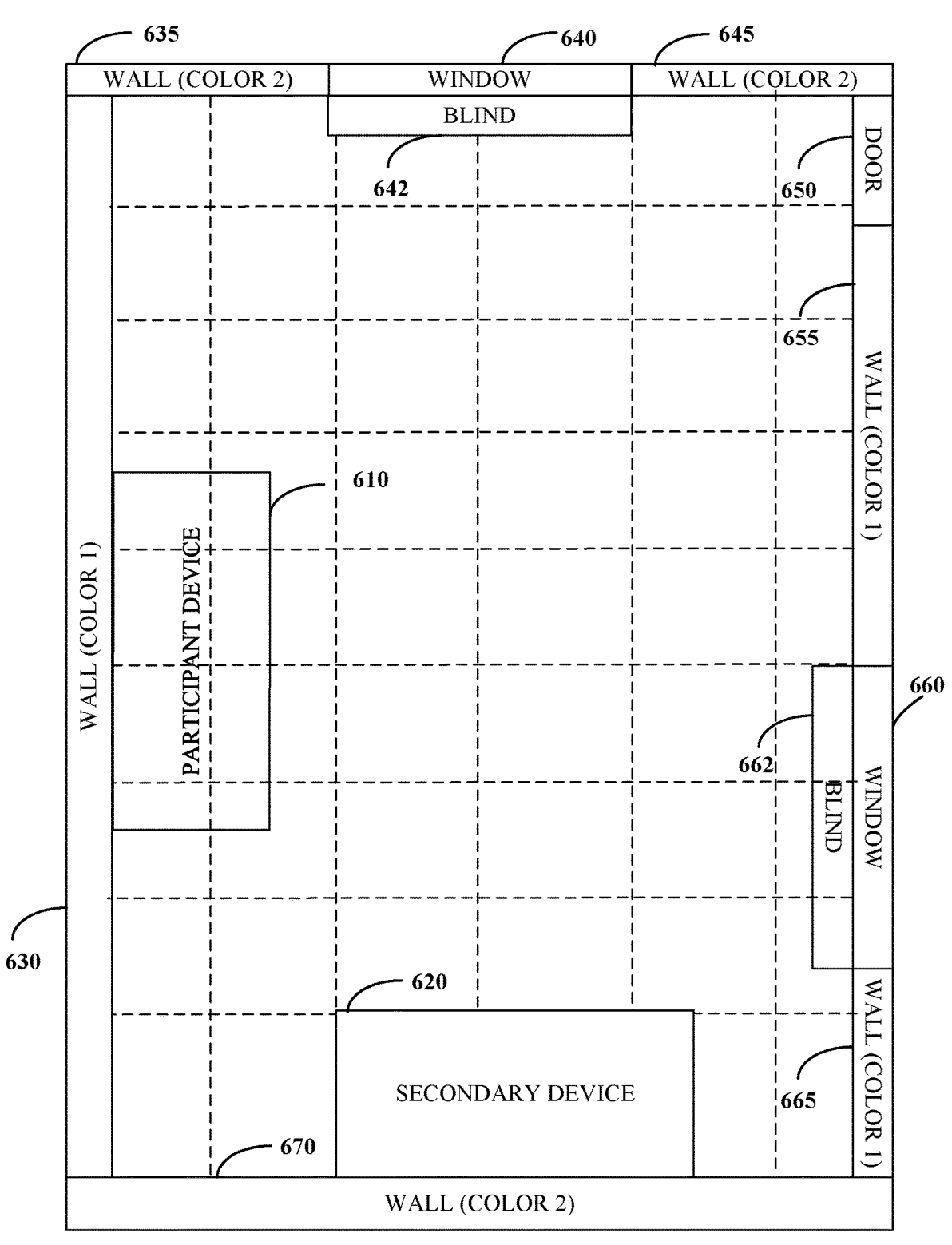
FIG. 6 is an illustration of an example of an augmented reality (AR) map depicting a location of a participant device in a physical environment.

The AR map generation tool 528 may generate an AR map for display on the scanning device 500. For example, the AR map may include a depiction of the objects, the one or more locations, and a color for each of the one or more locations. Such AR map with depiction of the objects, the one or more locations, and a color for each of the one or more locations is illustrated in FIG. 6.

The color adjustment tool 530 may determine a color to use for the virtual background in the video stream based on the color of a location(s) proximate to the participant device and a color of the current virtual background. For instance, the location may be a wall(s) or a corner that is behind the participant device. In this instance, behind refers to a direction opposite to a display or viewing direction of the participant device. The color adjustment tool 530 may determine whether a color of the current virtual background and the wall are the same. In some implementations, the color adjustment tool 530 may determine whether a hue of the current virtual background color and the wall color are the same, where a hue refers to the origin of the color that is seen. For instance, the colors burgundy, pink, and light red may be referred to having a same hue of red. The color adjustment tool 530 may select a new color and/or a new hue for the virtual background when or if the color and/or the hue of the color of the current virtual background and the wall are the same. In some implementations, the color adjustment tool 530 may select a color that is contrasting with the color of the wall. In some implementations, the color adjustment tool 530 may select a color that is complementary with the color of the wall. In some implementations, the color adjustment tool 530 may select a hue that is different than the hue of the wall.

In some implementations, the virtual background may include a font color. The color adjustment tool 530 may determine whether a font color of the current virtual background and the color of the wall are the same. In some implementations, the color adjustment tool 530 may determine whether a hue of the font color used in the current virtual background and the hue of the color of the wall are the same. The color adjustment tool 530 may select a new color and/or a new hue for the font used in the virtual background when or if the color and/or the hue of the color of the current virtual background and the wall are the same. In some implementations, the color adjustment tool 530 may select a color that is contrasting with the color of the wall. In some implementations, the color adjustment tool 530 may select a color that is complementary with the color of the wall. In some implementations, the color adjustment tool 530 may select a hue that is different than the hue of the wall.

In some implementations, the virtual background may include an object having a color. For instance, the color of object may be the color of clothing of a person appearing in the video stream. The color adjustment tool 530 may determine whether an object color and the color of the wall are the same. In some implementations, the color adjustment tool 530 may determine whether a hue of the object color and the hue of the color of the wall are the same. The color adjustment tool 530 may select a new or different color and/or a new hue for the object color when or if the color and/or the hue of the color of the current virtual background and the wall are the same. In some implementations, the color adjustment tool 530 may select a color that is contrasting with the color of the wall. In some implementations, the color adjustment tool 530 may select a color that is complementary with the color of the wall. In some implementations, the color adjustment tool 530 may select a hue that is different than the hue of the wall.

In some implementations, the color adjustment tool 530 may select colors and/or hues for the virtual background, the font, the object, and/or combinations based on the color of the wall and a color of the current virtual background to enhance visual presentation and/or provide coordinated visual elements to a participant watching a display on the participant device.

In some implementations, the color adjustment tool 530 may select colors and/or hues for the virtual background, the font, the object, and/or combinations based on the color of the wall, the color of the current virtual background, and/or user input or preference to enhance visual presentation and/or provide coordinated visual elements to a participant watching a display on the participant device. In the instance the current color is multiple shades or hues of one color, then the color adjustment tool 530 may select a new or different color based on a present or default palette, a user may select a solid color for input to the color adjustment tool 530, and/or combinations thereof.

In some implementations, the color adjustment tool 530 may adjust the selected or new color(s) and/or hue(s) based on the estimated light properties or characteristics. For instance, the color adjustment tool 530 may adjust the brightness level, saturation level, light direction, light color temperature, and other characteristics of the selected or new color(s) and/or hue(s).

The color adjustment tool 530 may modify the video stream to replace the current virtual background color with the new virtual background color. The modification or adjustment may be by adjusting one or more virtual background parameters, including but not limited to, color, exposure, brightness, contrast, and/or ISO level. In some implementations, modifying the virtual background color may include modifying the font color, the object color, and/or combinations thereof. In some implementations, the color of the font may be changed based on users who are color blind, e.g., from the current color to protanopia (army green, lavender, navy blue).

The adjusted video stream outputting tool 532 may output the modified or adjusted video stream along with instructions, commands, or other information configured to cause the participant device to output the modified or adjusted video stream to the participant(s) during the conference. In some implementations, the modified video stream outputting tool 532 may output those instructions, commands, or other information to a secondary device associated with the participant(s). For example, in a hybrid online classroom setting, a video stream may be received at a first device of a participant and adjusted as described in this disclosure. The adjusted video stream may be output at the first device and at a second device connected to the first device. The second device, for example, can be a large screen display connected to the first device. For instance, the wall is also behind the second device. In some implementations, the location estimation tool 526 and/or the AR generation tool 528 may determine that the second device is at a different location. In this instance, the color adjustment tool 530 may select color(s) and/or hue(s) according to a color of the different location and may modify the video stream being sent to the second device, and the adjusted video stream outputting tool 532 may output the modified or adjusted video stream, as appropriate Although the tools 522 through 532 are shown as functionality of the virtual background color adjustment software 520 as a single piece of software, in some implementations, some or all of the tools 522 through 532 may exist outside of the virtual background color adjustment software 520 and/or the software platform may exclude the virtual background color adjustment software 520 while still including some or all of tools 522 through 532 in some form elsewhere.

In some implementations, the scanning device 500 may be the participant device. For example, the scanning device 500 and the participant device may be a single mobile device (e.g., a smartphone, smartphone, a tablet computer, or a laptop computer) equipped with the sensor(s) 502, in which the single mobile device can execute the virtual background color adjustment software 520 to process sensor data collected from the sensor(s) 502 to determine the new colors for itself. For example, when the scanning device 500 is a laptop equipped with the sensor(s) 502, a user of the laptop or the meeting participant can walk around the room with the laptop and scan the room to collect sensor data, and virtual background color adjustment software 520 can process the sensor data as described herein. For example, when the scanning device 500 is a smartphone equipped with the sensor(s) 502, a user of the smartphone or the meeting participant can walk around the room with the smartphone and scan the room to collect sensor data, and the virtual background color adjustment software 520 can process the sensor data as described herein.

In some implementations, a scanning device, such as the scanning device 500, can send sensor data corresponding to the ambient qualities of each of one or more locations within a physical environment to a participant device located in the physical environment, such as one of the clients 104A through 104D. The sensor data may be obtained in a similar manner as described with respect to the scanning device 500 and the sensor(s) 502 of FIG. 5, so will not be repeated here. The participant device may implement a virtual background color adjustment software, such as the virtual background color adjustment software 520. The virtual background color adjustment software may determine a current virtual background color, determine a new or different virtual background color, modify the current virtual background color with the new virtual background color, and perform other processing in a similar manner as described with respect to the virtual background color adjustment software 520 of FIG. 5, so will not be repeated here.

In some implementations, a scanning device, such as the scanning device 500, can send sensor data corresponding to the ambient qualities of each of one or more locations within a physical environment to an application server, such as the application server 108, a conferencing software, such as the conferencing software 314, or a conferencing system, such as the conferencing system 400 (collectively a "server-side system"). The sensor data may be obtained in a similar manner as described with respect to the scanning device 500 and the sensor(s) 502 of FIG. 5, so will not be repeated here. The server-side system may implement a virtual background color adjustment software, such as the virtual background color adjustment software 520. The virtual background color adjustment software may determine a current virtual background color, determine a new or different virtual background color, modify the current virtual background color with the new virtual background color, and perform other processing in a similar manner as described with respect to the virtual background color adjustment software 520 of FIG. 5, so will not be repeated here. The server-side system may send the modified video stream to a participant device located at a location in the physical environment.

In some implementations, a scanning device, such as the scanning device 500, can send sensor data corresponding to the ambient qualities of each of one or more locations within a physical environment to a participant device, such as one of the clients 104A through 104D. The sensor data may be obtained in a similar manner as described with respect to the scanning device 500 and the sensor(s) 502 of FIG. 5, so will not be repeated here. The participant device may implement a virtual background color adjustment software, such as the virtual background color adjustment software 520. The virtual background color adjustment software may determine a current virtual background color, determine a new or different virtual background color, modify the current virtual background color with the new virtual background color, and perform other processing in a similar manner as described with respect to the virtual background color adjustment software 520 of FIG. 5, so will not be repeated here. The participant device may send the modified video stream to a participant device located at a location in the physical environment.

FIG. 6, as described above, is an illustration of an example of an AR map 600 depicting each of one or more locations in a physical environment, a participant device 610, and colors associated with each of the one or more locations. Moreover, in some implementations, the AR map may include a depiction of a secondary device 620 at a second location. For instance, the one or more locations may include a wall 630 with a color 1, a wall 635 with a color 2, a window 640 with a blind 642, a wall 645 with color 2, a door 650, a wall 655 with the color 1, a window 660 with a blind 662, a wall 665 with the color 1, and a wall 670 with the color 2. The wall 630 with the color 1 is behind the participant device 610 and the wall 670 with the color 2 is behind the secondary device 620. As described with respect to FIG. 5, a virtual background color adjustment software may determine different or new virtual background colors for the participant device 610, the secondary device 620, or combinations thereof based on the color 1 and color 2, respectively.

Figure 7:
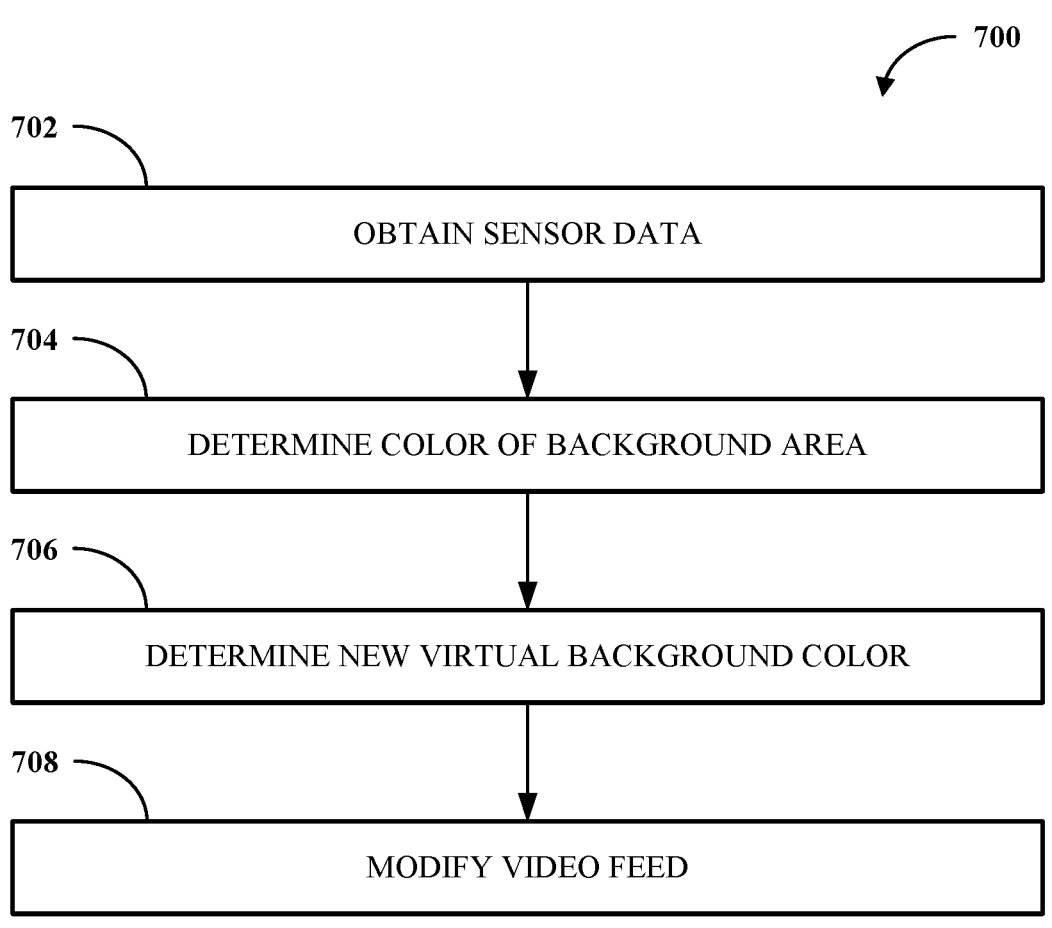
FIG. 7 is a flowchart of an example of a technique for determining a new virtual background color for a video stream displayed on a participant device in a video conference.

To further describe some implementations in greater detail, reference is next made to examples of techniques which may be performed by or using a system for virtual background color adjustment. FIG. 7 is a flowchart of an example of a technique 700 for virtual background color adjustment. The technique 700 can be executed using computing devices, such as the systems, hardware, and software described with respect to FIGS. 1-5. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations of the technique 700 in accordance with this disclosure can occur in various orders and/or concurrently. Additionally, other steps or operations not presented and described herein may be used. Furthermore, not all illustrated steps or operations may be required to implement a technique in accordance with the disclosed subject matter. In some implementations, the technique 700 or portions thereof may be done in real-time. In some implementations, the technique 700 or portions thereof may be done automatically.

At 702, sensor data is obtained. The sensor data may be obtained by a scanning device (e.g., the scanning device 500) or a device equipped with one or more sensors capable of obtaining sensor data representing or including ambient qualities of one or more locations within a physical environment. In some implementations, the scanning device may include a processor to process such sensor data that represent the ambient qualities of the one or more locations, and determine a color of the one or more locations.

For example, the one or more sensors may include camera(s) (e.g., video camera), color sensors, ambient light sensor(s), depth sensor(s), ultrasonic sensor(s), sonar sensor(s), motion sensor(s) (e.g., accelerometer, gyroscope), magnetometer(s), and/or GPS.

The sensor data may include or be equivalent to the sensor data (obtained from the sensor(s) 502) as described with respect to FIG. 5. For example, the sensor data may include one or more of video data, image data, color data, object data, location data, light property data, and/or light intensity data. For example, the user of the scanning device may utilize the scanning device to take a video, photos, and/or scan the room. For example, the sensor data may be obtained or collected at the one or locations within the room while the user is moving around the room.

At 704, a color of a location (e.g., a wall) behind an object (e.g., a participant device) may be determined. The location behind the object may be referred to as a background area, which can include, but is not limited to, a wall, a corner, a lamp, a curtain, a blind, or other appropriate or applicable items in the physical environment. The location color may be determined from one or more of the video data, image data, color data, object data, location data, and/or light intensity data. For instance, the location data (including AR map data) and object data may be used to determine where the object is within a physical environment and which wall is behind the object. The color data and the light intensity data can then be used to determine a color of the wall. In some implementations, there may be multiple objects for displaying the video stream. Location(s) and color(s) of each of the objects may be determined. In some implementations, the color of the wall may be determined by the scanning device, the participant device, the server, another device, and/or combinations thereof.

At 706, new color(s) may be determined for a virtual background and/or components therein (e.g., fonts and objects). The color(s) may be based on the sensor data and current color(s) of the virtual background and/or components therein. For example, determining the color for the virtual background and/or components therein may include determining color(s) for a current virtual background and/or components therein. The current color(s) for the virtual background and/or components therein may be compared with the color of the wall. New color(s) for the virtual background and/or components therein may be determined if the current color for the virtual background and/or components therein is the same or substantially the same color and/or hue as the wall. For instance, the new color(s) may provide contrast with respect to the wall color, the new color(s) may be complementary, the new color(s) may have a different hue, and/or combinations thereof. In some implementations, each of the new color(s) for the virtual background and/or components therein may be selected and compared against each other to provide a coordinated visual presentation. In some implementations, new color(s) may be determined for each virtual background relative to each object for displaying the video stream. In some implementations, the new color for the virtual background and/or components therein may be determined by the participant device, the server, another device, and/or combinations thereof.

At 708, the video stream may be modified using the new color(s) for the virtual background and/or components therein. In some implementations, the modified video stream may be adjusted based on the light intensity data and/or the light property data. For instance, saturation levels, brightness levels, light directionality, and/or combinations thereof may be applied to the new virtual background color, the modified video stream, and/or combinations thereof. For example, the brightness levels and the light directionalities may be based on a height of ceiling of the physical environment and by using a light detection and ranging (LiDAR) sensor of the scanning device. In some implementations, the video stream may be modified by the participant device, the server, another device, and/or combinations thereof.

Figure 8:
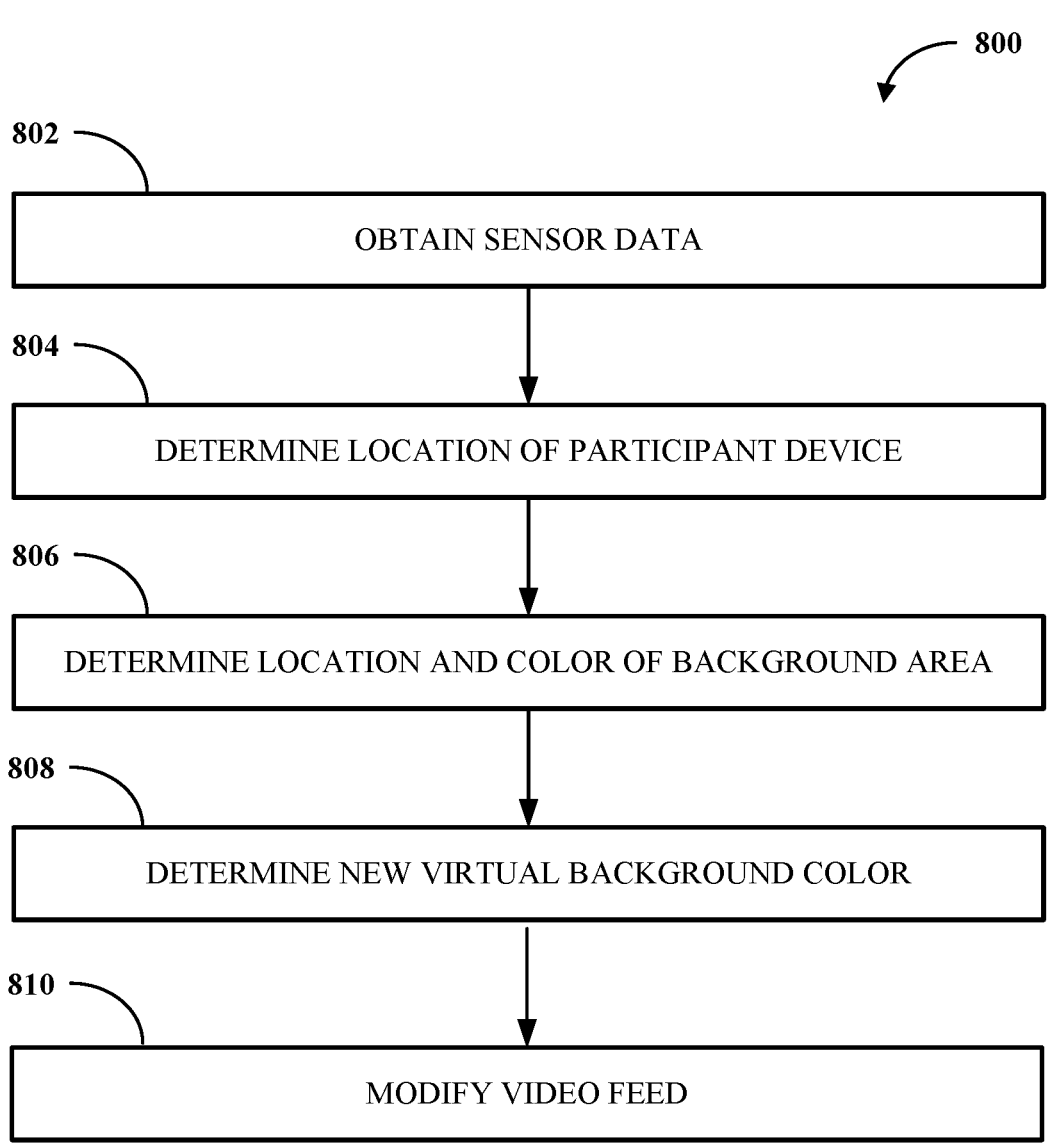
FIG. 8 is a flowchart of an example of a technique for determining a new virtual background color for a video stream displayed on a participant device in a video conference.

FIG. 8 is a flowchart of an example of a technique 800 for virtual background color adjustment. The technique 800 can be executed using computing devices, such as the systems, hardware, and software described with respect to FIGS. 1-5. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof. In some implementations, the technique 800 or portions thereof may be done in real-time. In some implementations, the technique 800 or portions thereof may be done automatically.

At 802, sensor data is obtained. The sensor data may be obtained in a similar manner as described with respect to step 702 of FIG. 7 and the sensor data obtained from the sensor(s) 502 of FIG. 5, so the technique will not be repeated here.

At 804, location of a participant device in the physical environment may be determined. The location of the participant device may be determined from one or more of the video data, image data, object data, and/or location data. An AR map may be generated from one or more of the video data, image data, object data, and/or location data which identifies a location of the participant device and any other device capable of displaying the video stream. The one or more of the video data, image data, object data, location data and/or AR map may be used to determine one or more location(s), i.e., wall(s), associated or proximate to the participant device and/or other device(s). For instance, the one or more location(s) may be a wall(s), corner, and the like which is behind the participant device and/or other device(s). In some implementations, the location may be determined by the scanning device, the participant device, the server, another device, and/or combinations thereof.

At 806, color(s) for each of the location associated with participant device and/or other device(s) are determined. The color(s) may be obtained in a similar manner as described with respect to step 704 of FIG. 7, so the description of the relevant operations will not be repeated here.

At 808, new color(s) for the virtual background and components therein may be determined. The new color(s) may be obtained in a similar manner as described with respect to step 706 of FIG. 7, so the description of the relevant operations will not be repeated here.

At 810, the video stream may be modified or adjusted with the new color(s) for the virtual background and components therein. The modified video feed may be processed in a similar manner as described with respect to step 708 of FIG. 7, so the description of the relevant operations will not be repeated here.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

In some implementations, described herein is a method which includes obtaining, by a scanning device within a physical environment, sensor data including color data of one or more locations within the physical environment, determining, based on the sensor data, a color of a background area behind a participant device that is used to connect to a video conference, determining, based on the color of the background area and a current virtual background color of a video stream corresponding to the video conference output for display at the participant device, a new virtual background color to use with the video stream, and modifying the video stream to replace the current virtual background color with the new virtual background color.

In some implementations, the color of the background area and the new virtual background color are either contrasting colors or complementary colors. In some implementations, the color of the background area and the current virtual background color have a same hue. In some implementations, the current virtual background color includes a font color, the font color and the color of the background area have a same hue, and the new virtual background color includes a new font color having a hue that is different from the same hue. In some implementations, the current virtual background color includes a clothing color of a human appearing on the video stream, and the new virtual background color includes a different clothing color that replaces the clothing color. In some implementations, the sensor data further includes brightness levels of the one or more locations, and the method further includes adjusting, based on the brightness levels, at least one of brightness level or a saturation level of the new virtual background color. In some implementations, the determining the new virtual background color of the video stream happens in real-time during the videoconference. In some implementations, the scanning device is a mobile phone equipped with a LiDAR sensor. In some implementations, the scanning device is the participant device. In some implementations, the determining the color of the wall behind the participant device includes generating, based on the sensor data, an augmented reality map of the physical environment, and determining a location of the participant device and a location of the wall within the augmented reality map, and determining the color of the background area.

In some implementations, a non-transitory computer readable medium storing instructions operable to cause one or more processors to perform operations comprising obtaining, by a scanning device within a physical environment, sensor data including color data of one or more locations within the physical environment, determining, based on the sensor data, a color of a background area behind a participant device that is used to connect to a video conference, determining, based on the color of the background area and a current virtual background color of a video stream corresponding to the video conference output for display at the participant device, a new virtual background color to use with the video stream, and modifying the video stream to replace the current virtual background color with the new virtual background color.

In some implementations, the color of the background area and the new virtual background color are complementary colors. In some implementations, the color of the background area and the new virtual background color have a same hue. In some implementations, the new virtual background color is determined based on a user preference. In some implementations, the sensor data further includes brightness levels and light directionalities at the one or more locations, the brightness levels and the light directionalities are determined based on a height of ceiling of the physical environment and by using a light detection and ranging (LiDAR) sensor of the scanning device and the instructions operable to cause one or more processors to perform further operations includes adjusting, based on the brightness levels and the light directionalities, a brightness level or a saturation level of the new virtual background color. In some implementations, the sensor data further includes brightness levels at the one or more locations, and determining the color of the background area includes generating, based on the sensor data, an augmented reality map of the physical environment, determining a location of the participant device and a location of the wall within the augmented reality map, determining a brightness level at the location of the background area, and determining, based on the location of the participant device and the brightness level, the color of the background area.

In some implementations, a system includes a scanning device configured to obtain sensor data including color data of one or more locations within a physical environment, a device configured to determine, based on the sensor data, a color of a background area behind a participant device that is used to connect to a video conference, determine, based on the color of the background area and a current virtual background color of a video stream corresponding to the video conference output for display at the participant device, a new virtual background color to use with the video stream, and modify the video stream to replace the current virtual background color with the new virtual background color.

In some implementations, the scanning device is one of a mobile phone or external camera. In some implementations, the device is a participant device. In some implementations the scanning device and the device are a participant device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
obtaining, by a scanning device within a physical environment, sensor data including color data of one or more locations within the physical environment;
determining, based on the sensor data, a color of a background area behind a participant device that is used to connect to a video conference;
determining, based on the color of the background area and a current virtual background color of a video stream corresponding to the video conference that is output for display at the participant device, a new virtual background color to use with the video stream, wherein the color of the background area and the new virtual background color are either contrasting colors or complementary colors; and
modifying the video stream to replace the current virtual background color with the new virtual background color.

2. The method of claim 1, wherein the new virtual background color is determined based on a user preference.

3. The method of claim 1, wherein the color of the background area and the current virtual background color have a same hue.

4. The method of claim 1, wherein:
the current virtual background color includes a font color;
the font color and the color of the background area have a same hue; and the new virtual background color includes a new font color having a hue that is different from the same hue.

5. The method of claim 1, wherein:

the current virtual background color includes a clothing color of a human appearing on the video stream; and the new virtual background color includes a different clothing color that replaces the clothing color.

6. The method of claim 1, wherein the sensor data further includes brightness levels of the one or more locations, and the method further comprises:

adjusting, based on the brightness levels, at least one of brightness level or a saturation level of the new virtual background color.

7. The method of claim 1, wherein determining the new virtual background color of the video stream happens in real-time during the video conference.

8. The method of claim 1, wherein the scanning device is a mobile phone equipped with a LiDAR sensor.

9. The method of claim 1, wherein the scanning device is the participant device.

10. The method of claim 1, wherein determining the color of the background area behind the participant device includes:

generating, based on the sensor data, an augmented reality map of the physical environment;

determining a location of the participant device and a location of a wall within the augmented reality map; and determining the color of the background area based on a color of the wall.

11. A non-transitory computer readable medium storing instructions operable to cause one or more processors to perform operations comprising:

obtaining, by a scanning device within a physical environment, sensor data including color data of one or more locations within the physical environment;

determining, based on the sensor data, a color of a background area behind a participant device that is used to connect to a video conference;

determining, based on the color of the background area and a current virtual background color of a video stream corresponding to the video conference that is output for display at the participant device, a new virtual background color to use with the video stream, wherein the color of the background area and the new virtual background color are either contrasting colors or complementary colors; and modifying the video stream to replace the current virtual background color with the new virtual background color.

12. The non-transitory computer readable medium of claim 11, wherein determining the new virtual background color of the video stream happens in real-time during the video conference.

13. The non-transitory computer readable medium of claim 11, wherein the color of the background area and the new virtual background color have a same hue.

14. The non-transitory computer readable medium of claim 11, wherein the new virtual background color is determined based on a user preference.

15. The non-transitory computer readable medium of claim 11, wherein:

the sensor data further includes brightness levels and light directionalities at the one or more locations;

the brightness levels and the light directionalities are determined based on a height of ceiling of the physical environment and by using a light detection and ranging (LiDAR) sensor of the scanning device; and the instructions operable to cause one or more processors to perform further operations comprising:

adjusting, based on the brightness levels and the light directionalities, a brightness level or a saturation level of the new virtual background color.

16. The non-transitory computer readable medium of claim 11, wherein:

the sensor data further includes brightness levels at the one or more locations; and determining the color of the background area comprises:

generating, based on the sensor data, an augmented reality map of the physical environment;

determining a location of the participant device and a location of a wall within the augmented reality map;

determining a brightness level at the location of the background area; and determining, based on the location of the participant device and the brightness level, the color of the background area.

17. A system comprising:

a scanning device configured to:

obtain sensor data including color data of one or more locations within a physical environment; and a device configured to:

determine, based on the sensor data, a color of a background area behind a participant device that is used to connect to a video conference;

determine, based on the color of the background area and a current virtual background color of a video stream corresponding to the video conference that is output for display at the participant device, a new virtual background color to use with the video stream, wherein the color of the background area and the new virtual background color are either contrasting colors or complementary colors; and modify the video stream to replace the current virtual background color with the new virtual background color.

18. The system of claim 17, wherein the scanning device is one of a mobile phone or external camera.

19. The system of claim 17, wherein the device is a participant device.

20. The system of claim 17, wherein the scanning device and the device are a participant device.

* * * * *